June 12, 1962  C. F. PALUKA  3,038,970
VEHICLE GUIDANCE SYSTEM
Filed Oct. 17, 1958  2 Sheets-Sheet 1
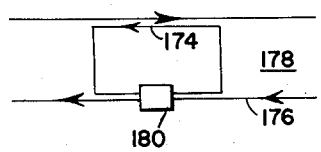
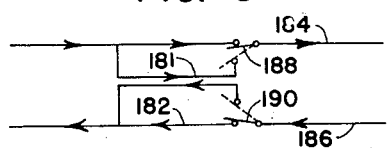
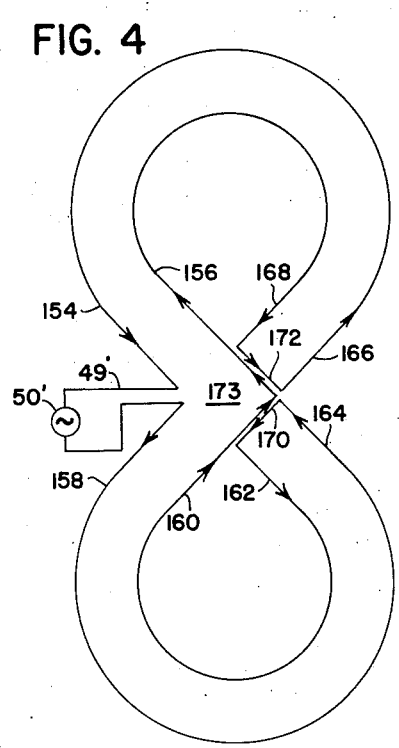
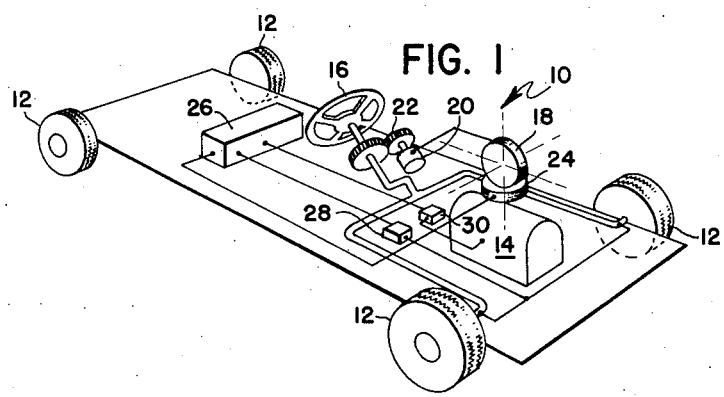
INVENTOR.
CHARLES F. PALUKA
BY
*William C. Babcock*
ATTORNEY June 12, 1962 C. F. PALUKA 3,038,970
VEHICLE GUIDANCE SYSTEM Filed Oct. 17, 1958 2 Sheets-Sheet 2

INVENTOR.
CHARLES F. PALUKA
BY
William C. Babcock
ATTORNEY

United States Patent Office 3,038,970
Patented June 12, 1962

3,038,970
VEHICLE GUIDANCE SYSTEM
Charles F. Paluka, St. Paul, Minn., assignor to General Mills, Inc., a corporation of Delaware
Filed Oct. 17, 1958, Ser. No. 767,816
7 Claims. (Cl. 191—2)

The present invention relates to improvements in vehicle guidance systems. More particularly, it pertains to guidance systems using electromagnetic field sensing for regulating the movement of a vehicle along a prearranged path.

Some systems presently available for vehicle guidance by means of electromagnetic sensing employ a single signal carrying wire or conductor. One such system locates the signal wire beneath the surface upon which the controlled vehicle rides. I have found it extremely difficult to use such a single wire system where the surface or road upon which the vehicle rides is not very smooth, since complications arise when the roads are muddy, bumpy and/or require extensive grading. Some two-wire guidance systems overcome some of the complications which arise when roads are muddy, bumpy and/or require extensive grading, but their use brings about new problems when portions of the path formed by the two wires cross one another, when it is desired to stop or turn one vehicle in one portion of the path without affecting the movement of other vehicles in other portions of said path, and when a turnaround portion in the path is desired.

I have also found it difficult with a one-wire guidance path system to remotely stop one vehicle in a predetermined portion (hold zone) along the guidance path and/or direct one vehicle to take a particular one of a number of branches where sections of the guidance path intersect, without affecting the movement of other vehicles also moving along other portions or sections of the guidance path.

Accordingly, one object of this invention is to provide a vehicle guidance path system in which one vehicle may be remotely stopped without affecting the electromagnetic field governing other vehicles in other portions or sections of the system.

A further object of this invention is to provide a vehicle guidance path system in which a vehicle may be directed along one of a number of branches of an intersection without affecting the electromagnetic field governing other vehicles in other portions or sections of the system.

Another object of this invention is to provide intersections in a vehicle guidance path system through which a vehicle may pass.

Another object is to provide a vehicle guidance system in which the routing of vehicles can be controlled without disrupting other traffic therein.

Another object is to provide for a vehicle guidance system intersections of mutually excited sections of the guidance path without loss of position sensing.

Other objects and advantages of the invention will be apparent from the following description in which certain preferred embodiments of the invention are disclosed. In the drawings which form a part of this application:

FIGURE 1 is a diagrammatical view of a vehicle which may be controlled by a guidance system utilizing the present invention;

FIG. 4 shows a modification of the intersection portion 32 of FIG. 2 in a figure 8 path;

FIG. 5 is a modification of the hold zone portion 38 of FIG. 2;

FIG. 6 is another modification of the hold zone portion 38 of FIG. 2.

Figure 2:
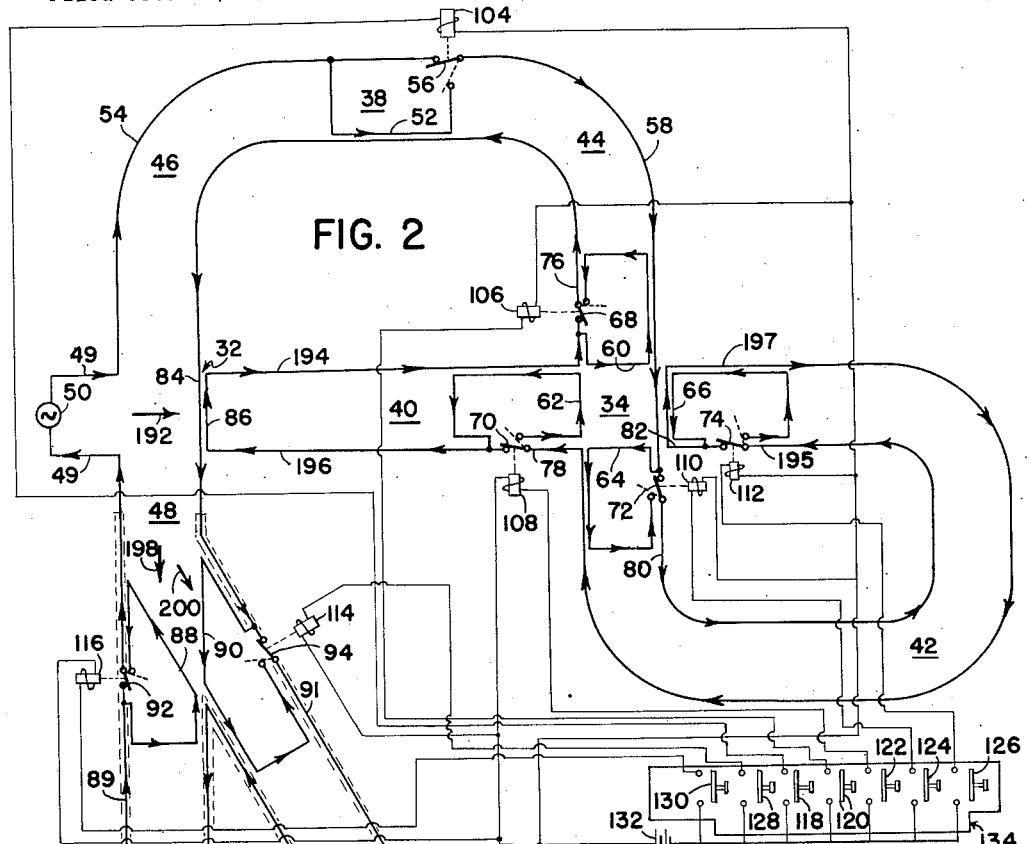
FIG. 2 is a diagrammatic view of an entire vehicle guidance path system and its associated controls.

FIG. 1 shows a vehicle 10 having wheels 12, a motor 14, and a steering mechanism 16 attached thereto. The steering mechanism 16 is linked to the wheels 12. Also mounted on the vehicle 10 is a vertical antenna 18 which is linked through a motor 20 and gears 22 to the steering mechanism 16 and a horizontal antenna 24 which is connected to a control box 26. The control box 26 is linked to a brake control mechanism 28 and a throttle control mechanism 30 which respectively regulate the brakes and throttle of the vehicle 10.

FIG. 2 shows a typical guidance path system having various path portions including intersections 32 and 34, a turnaround 36, and a hold zone 38. These portions 32, 34, 36 and 38 are linked together by intermediate path portions 40, 42, 44, 46 and 48. Each of said portions is bounded along its sides by sections of an electric conductor 49. That is, although each portion 32, 34, 36, 38, 40, 42, 44, 46 and 48 have what appear to be electric conductors along at least parts of each side thereof, all of said conductors are sectors of the conductor 49.

A varying parameter signal generator 50 is linked to the guidance path system formed by the novel orientation of the various sectors of electric conductor 49.

Accordingly, one embodiment of this invention is using a single conductor so arranged that it defines between various sectors thereof a path along which a vehicle travels. Where certain portions of this path must cross each other it is often necessary for sectors of said single conductor to cross said path. Where the desired layout requires that one sector cross the path of vehicle travel, a second sector is positioned parallel to and adjacent to said one sector. Said one sector and said second sector are linked to the signal source and the other sectors forming the path so at any given instant any signal in either of said one or second sector is equal to, but opposite in direction to, that in the other.

The hold zone portion 38 has an auxiliary wire or conductor 52 connected to a sector 54 of the electrical conductor 49 of the intermediate portion 46. Through a solenoid-actuated switch 56 the auxiliary conductor 52 is selectively linked to a sector 58 of the conductor 49 of the intermediate portion 44.

The intersection portion 34 has electrically associated therewith four auxiliary wires or conductors 60, 62, 64, and 66. These conductors 60, 62, 64 and 66 are selectively linked through switches 68, 70, 72, and 74 to sectors 76, 78, 80 and 82 of the conductor 49.

The intersection portion 32 has one of the sectors 84 of the conductors 49 of the portion 46 continuing across one edge of said portion 32, to the portion 48. An auxiliary conductor 86, which is another sector of the conductor 49, runs parallel to and adjacent to the part of said sector 84 where sector 84 crosses the intersection 32.

The turnaround portion 36 includes auxiliary conductors 88 and 90. The auxiliary conductors 88 and 90 are joined selectively to main conductor 49 through solenoid-controlled switches 92 and 94 which are positioned in sectors 89 and 91 of conductor 49. Sectors 89 and 91 run along one side of the turnaround portion 36 and are part of its outer loop which is enclosed by the dotted outline 102. The turnaround portion 36 also has an inner loop which is enclosed by the dotted outline 96 linked by auxiliary conductors 98 and 100 to the outer loop 102. The conductors 98 and 100 are also sectors of conductor 49 which are adjacent to and parallel to each other.

The solenoids 104, 106, 108, 110, 112, 114, 116 are electrically connected to push buttons 118, 120, 122, 124, 126, 128 and 130, respectively, through a power source 132. The push buttons 118, 120, 122, 124, 126, 128, and 130 are mounted on a control box 134.

Figure 3:
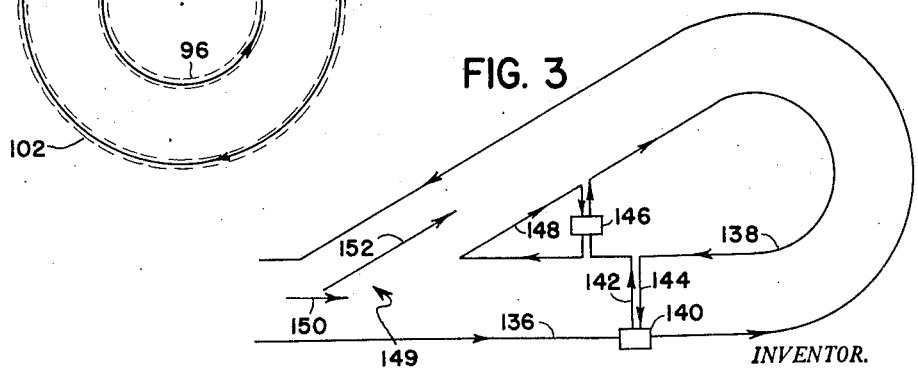
FIG. 3 is a modification of the turnaround portion 36 of FIG. 2.

FIG. 3 shows a modified construction of the turnaround portion 36 of FIG. 2 whereby current from the outer loop 136, similar to the outer loop enclosed by 102, can impress a current on the inner loop 138, similar to inner loop enclosed by 96, by means of a transformer 140 and two adjacent, parallel auxiliary conductors 142 and 144 electrically linked therebetween to carry current to the inner loop without affecting the desired field where such wires cross the vehicle path. In addition, by means of a transformer 146 which is associated with the loop 138, a current can be impressed in loop 148. By the proper selection of the windings of the coils of the transformer 146, the electromagnetic field created between the loop 148 and the outside loop conductor 136 at the branch or junction 149 can be varied, e.g. intensified, change magnitude thereof, to insure that a vehicle moving in the direction of arrow 150 will not veer from its course and proceed in the direction of arrow 152.

FIG. 4 is another type of path instersection showing how electrical conductors 154, 156, 158, 160, 162, 164, 166, and 168 and auxiliary conductors 170 and 172, which are all sectors of a conductor 49' form an intersection 173 so that a vehicle approaching said intersection can pass straight through.

FIG. 5 is a modification of the hold zone portion 38 of FIG. 2 in which the auxiliary conductor 174 is linked to one of the sectors 176 of the conductor forming the side of the guidance path 178 through a transformer 180.

FIG. 6 is another modification of the hold zone portion 38 of FIG. 2 in which auxiliary conductors 181 and 182 lie in close proximity to each other and are energized from the side conductors 184 and 186 of the guidance path selectively and instantaneously by means of switches 188 and 190. This arrangement avoids fringing effects due to propagation along the unused wire of a portion like 38 from somewhat affecting the position sensing at the wire crossovers.

In operation, the signal generator 50 of FIG. 2, impresses an electrical current having a time varying parameter upon the conductor 49, the various sectors of which bound the sides of the path along which it is deisred that the vehicle 10 proceed. At one particular instant the current flows in the direction indicated by the arrows placed on the various sectors of electrical conductor 49. It will be noted that at said given instant the current in the two sectors of the conductor 49 on either side of any given portion of the path flows in opposite directions.

Whenever a single conductor sector such as 84 crosses the path along which a vehicle 10 is moving, said vehicle will stop. Also, if the current ceases to exist in the conductor sectors bounding any of the portions 32, 34, 36, 38, 40, 42, 44, 46 and/or 48, any vehicle moving therein will stop. This stopping of the vehicle 10 is caused by the signals either induced in or not induced in the horizontal antenna 24 of the vehicle 10 by the current flowing or not flowing through the conductor 49. The signals induced in the horizontal antenna 24 are transmitted to the control box 26. In control box 26 they are analyzed. Based on this analysis, the control box actuates the brake 28 or the throttle 30, so the vehicle 10 moves or stops. Means for performing the foregoing functions are known in the art and will not be discussed here.

To permit the vehicle 10 to cross the intersection 32 in the direction indicated by arrow 192, a current equal and opposite in direction of flow to the current flowing in the part of conductor 84 which crosses over said intersection 32 is impressed upon the auxiliary conductor 86. Since these currents are equal in magnitude, but flowing in opposite directions, the electromagnetic fields created thereby cancel or nullify each other. Therefore the horizontal antenna 24 only senses an electromagnetic field at right angles thereto, and at right angles to the desired direction of vehicle movement indicated by arrow 192, rather than directly in the path of said vehicle movement, and the vehicle can move across the intersection in the direction of arrow 192. This comes about since there no longer is an electromagnetic field at right angles to the main guidance path which can be sensed by the horizontal antenna 24.

As the vehicle 10 travels along the guidance path in the direction of arrow 192 toward the intersection 34, the electromagnetic field created by the current flowing in sectors 194 and 196 of conductor 49 maintain said vehicle between said sectors. The vehicle 10 is steered by the signals induced in the vertical antenna 18 by the current flowing through the conductor 49. The signals induced in the vertical antenna 18 are transmitted to and actuate the motor 20. The motor drives the gears 22 which turn the front wheels 12 in the desired direction to keep vehicle 10 between conductor sectors like 194 and 196. Means for performing the foregoing functions are known in the art and will not be discussed here.

Upon reaching the intersection 34, it may be desirable to have the vehicle 10 continue straight through the intersection, turn down the left branch of the intersection toward intermediate portion 44, or turn down the right branch of said intersection toward portion 42. Because of the manner in which the conductor 49 is arranged, the vehicle 10 will normally continue straight through the intersection 34. On the other hand, to turn the vehicle something must be done. The right or left turn can be controlled by an operator positioned at a remote station.

To turn the vehicle 10 to the left, the operator depresses buttons 124 and 126, thereby actuating solenoids 110 and 112, respectively, which in turn move the switches 72 and 74 from their solid line positions to their dotted positions. When switches 72 and 84 are in their dotted positions, the current will flow in the auxiliary conductors 64 and 66 as indicated by the arrows thereon. The electromagnetic field created by the currents in said conductors 64 and 66 is picked up by the vertical antenna 18 of the vehicle 10 and said vehicle will turn to the left.

To turn the vehicle 10 to the right, the operator would depress buttons 120 and 126, thereby actuating solenoids 106 and 112, which in turn move switches 68 and 74 from their solid line positions to their dotted positions. In their dotted positions, switches 68 and 74 permit current to flow through the auxiliary conductors 60 and 66 in the direction indicated by the arrows thereon. These currents create an electromagnetic field which is sensed by the vertical antenna 18 of the vehicle 10. The vertical antenna 18 transmits signals indicative of this field to the steering mechanism 16 which, in turn, causes the vehicle 10 to turn to the right. Similarly, a vehicle 10 approaching the intersection 34 down any one of the other branches leading therein can be turned to the left or the right by energizing the appropriate auxiliary conductors 60, 62, 64 or 66.

The vehicle 10 will go straight through the intersection 34 in the direction of arrow 192 if the operator does not depress the right or left turn buttons as described above. The operator may, by depressing buttons 120 and 124, actuate solenoids 106 and 110, which in turn move switches 68 and 72 from their solid line positions to their dotted line positions. In their dotted positions, switches 68 and 72 permit current to flow through the auxiliary conductors 60 and 64 in the direction indicated by the arrows thereon. These currents in conductors 60 and 64 set up electromagnetic fields therearound which add to the fringe effects of the electromagnetic fields caused by the currents flowing in sectors 194 and 196 of portion 44 and sectors 195 and 197 of the portion 42. These reinforced fringe electromagnetic fields insure that the vehicle 10 will go straight across the intersection 34. Similarly, the other electromagnetic fringe fields of an intersection like 34 can be reinforced.

Upon approaching the turnaround portion 36 in the direction of the arrow 198, a vehicle 10 can be made to proceed either in the direction of arrow 198 or arrow 200 by a remotely located operator. If the conductors along the sides of the path portion 48 are properly positioned in relation to the conductor sector forming the inner loop 96 of the turnaround portion 36, a vehicle 10 will normally follow the direction indicated by arrow 198. On the other hand, due to road or path parameter variations, i.e. rocks, bumps, slopes, etc. in the path, the vehicle may veer off the desired path 198 and turn down the path indicated by arrow 200. To positively eliminate such veering off and to be able to make a vehicle 10 follow either the path indicated by arrow 198 or arrow 200, auxiliary conductors 88 and 90 have been positioned transverse to the paths which the vehicle 10 would proceed along if it followed arrows 198 or 200, respectively. By depressing button 128, an operator will actuate solenoid 114, which will move switch 94 from its solid line position to its dotted line position. When the switch 94 is in its dotted line position, a current will flow through the auxiliary conductor 90 in the direction of the arrow thereon. This current creates an electromagnetic field which the vertical antenna 18 of the vehicle 10 senses. Because of this field, a signal is sent from said vertical antenna 18 to the steering mechanism 16, which keeps said vehicle 10 from veering off of the path indicated by arrow 198.

By depressing button 130, the operator actuates solenoid 116, which moves switch 92 from its solid line position to its dotted line position. In its dotted line position, switch 92 permits current to flow in the auxiliary conductor 88 in the direction indicated by the arrow thereon. This current creates an electromagnetic field which is sensed by the vertical antenna 18 of the vehicle 10. Because of this field, a signal is transmitted from the vertical antenna 18 to the steering mechanism 16, which turns the wheels of the vehicle so that said vehicle follows the path indicated by arrow 200.

Auxiliary conductors 98 and 100 permit current to flow from the conductor sector 102 to the inner loop 96 of the turnaround portion 36. By keeping the two auxiliary conductors 98 and 100 parallel to and adjacent to each other, the electromagnetic fields created therein by the current passing therethrough cancel or nullify each other. Since they cancel each other, a vehicle 10 moving along said turnaround portion 36 will not sense any field which traverses the electromagnetic field created by the currents in the conductor sectors 96 and 102 along the sides of the guidance path of the turnaround.

The modified turnaround portion shown in FIG. 3 has its inner loop 138 energized through the parallel auxiliary conductors 142 and 144 which are similar to conductors 98 and 100. The conductors 142 and 144 are linked to the conductor sector 136 of the outer loop of the turnaround portion by the transformer 140. As is well known in the electrical art, the conductors 142 and 144 can be energized through the transformer 140 by a switch remotely controlled by an operator. The arrows on the conductors 136 and 138 indicate the instantaneous direction of current flows therein. Through transformer 146 the auxiliary loop 148 can be energized to create an electromagnetic field of sufficient strength so any vehicle approaching the branch or junction of the turnaround portion in the direction of arrow 150 will continue in the direction of arrow 150 and not veer off in the direction of arrow 152, due to the widening of the path at said junction.

The hold zones of FIGS. 5 and 6 can be activated by a remotely located operator by depressing buttons similar to 118—130 which activate solenoids similar to 104—116, which in turn move the switches 188 and 190 from their solid line positions to their dotted line positions or which externally control the current the transformer 180 establishes in conductor 174. Means for remotely controlling said switching and transformer actuation are well known in the electrical art and will not be discussed here.

All of the hold zones (portion 38 of FIG. 2, FIG. 5 and FIG. 6) cause a vehicle 10 to stop therein in the same general manner, by nullifying the electromagnetic field thereat. As previously stated, the vehicle 10 is caused to stop by signals either induced in or not induced in the horizontal antenna 24 by the current flowing or not flowing through the conductor 49. To stop the vehicle 10 in hold zone 38, the operator pushes button 118, thereby actuating solenoid 104, which in turn moves the switch 56 from its solid line position to its dotted position. When switch 56 is in its dotted position, current will flow in the auxiliary conductor 52 as indicated by the arrow thereon. This current is equal and opposite in direction of flow to the current flowing in the sector 53 of the conductor 49. The electromagnetic field created by the currents in said conductor 52 and said sector 53 cancel or nullify each other. Therefore, the horizontal antenna 24 will no longer sense an electromagnetic field at right angles to the path of desired vehicle movement. When antenna 24 does not sense such an electromagnetic field, the signal induced therein ceases to exist and no signal is transmitted to the brake mechanism 28. The brake mechanism is set so when no signal is received there, it will brake or stop the vehicle 10.

The novel orientation of the auxiliary conductors at the intersections, at the hold zones, and between the inner and the outer current carrying loops of the turnarounds disclosed herein permit performing a function, i.e. turning, switching, stopping, at one position along the prearranged path without affecting the performance of functions along the same or mutually excited paths. It also permits a vehicle to cross intersections of paths bounded by mutually excited electromagnetic fields without disturbing the movement of said vehicle through said intersection.

Such an arrangement for hold zones, switching, intersections, and turnarounds permits using conductors positioned on both sides of the path along which it is desired that a vehicle follow. By combining the various intersections, switches, hold sections, and turnaround portions as disclosed herein, one can construct a guidance path along which many vehicles can operate at the same time and each can be individually controlled without interfering with the operation or controls of the others.

In view of the principles set forth herein, some of the ways of carrying out the present invention and some of the equivalents which are suggested by these disclosures have been shown.

Now, therefore, I claim:

1. An electromagnetic sensing path comprising a continuous conductor having associated conductive sections laterally spaced and substantially parallel to define therebetween a substantially continuous prearranged course, means for electrically energizing said conductor so the direction of current flow in one of said associated substantially parallel sections at any given instant is opposite in direction to that in the other of said associated substantially parallel sections, an auxiliary conductor positioned adjacent to a preferred portion of one of said associated substantially parallel sections, and means for electrically energizing said auxiliary conductor so the direction of current flow therein will be opposite in direction to the direction of current flow in said one of said associated sections.

2. An electromagnetic sensing path comprising a continuous conductor having associated conductive sections laterally spaced and substantially parallel to define therebetween a substantially continuous prearranged course, means for electrically energizing said conductor so the direction of current flow in one of said associated substantially parallel sections at any given instant is opposite in direction to that in the other of said associated substantially parallel sections, first and second auxiliary conductors positioned in a preferred portion of the electromagnetic sensing path established by said associated substantially parallel conductive sections, and means for electrically energizing said auxiliary conductors so the direction of current flow in said first auxiliary conductor will be opposite in direction to the direction of current flow in one of said associated conductive sections and the direction of current flow in said second auxiliary conductor will be opposite in direction to the direction of current flow in the other of said associated conductive sections.

3. An electromagnetic sensing path comprising a conductive element having sections thereof laterally spaced and substantially parallel to define therebetween a substantially continuous prearranged course, means for electrically energizing said element so the current in said sections thereof along opposite sides of said path flows in opposite directions at any given instant, at least one section of said element extending transversely across a part of said path, an auxiliary conductive section positioned closely adjacent to said one transversely extending section, and means for connecting said auxiliary section to carry current in a direction opposite to the direction of current in said one transversely extending section.

4. An electromagnetic sensing path comprising an electrically energized conductor having sectors thereof laterally spaced to define a substantially continuous path, means for electrically energizing said sectors, a turnaround portion in said path, said turnaround portion including inner and outer conductor loop sectors, said inner and outer conductor loop sectors carrying current with the direction of current flow in one of said loop sectors at any given instant being opposite in direction to that in the other loop sector, a pair of adjacently positioned auxiliary conductors extending transversely across a part of said path, each of said pair of conductors being electrically linked to said inner and outer loop sectors to carry current therebetween in opposite directions at any given instant.

5. An electromagnetic sensing path comprising an electrically energized conductor having sectors thereof laterally spaced to define a substantially continuous path including an intersection portion, a hold zone portion and a turnaround portion, said portions being connected by sectors of said conductor carrying current in opposite directions along opposite sides of said path, at said intersection portion at least one sector of said conductor extending transversely across a part of said path, a first auxiliary conductor sector positioned closely adjacent to said transversely extending sector, means for connecting said first auxiliary sector to carry current in a direction opposite to the direction of the current in said transversely extending sector, said hold zone portion being in a part of said path where sectors of said conductor carry current in opposite directions along opposite sides thereof, a second auxiliary conductor sector positioned closely adjacent to a sector of said conductor along one side of said path at said hold zone portion, means for connecting said auxiliary sector to carry current in a direction opposite to the direction of the current in said sector along said one side, said turnaround portion including inner and outer conductor loop sectors, and a pair of adjacent auxiliary conductor sectors extending transversely across a part of said path at said turnaround portion, said pair of sectors being connected to said inner and outer loop sectors and carrying current in opposite direction so said inner loop sector carries current in a direction opposite to the direction of the current in said outer loop sector.

6. A path in accordance with claim 5 in which said laterally spaced sectors, said transversely extending sector, said first auxiliary conductor sector, said loop sectors and said pair of sectors extending transversely across a part of said path are all sectors of said electrically energized conductor, said conductor being continuous.

7. An electromagnetic sensing path comprising a conductor having associated conductive sections laterally spaced and substantially parallel to define therebetween a substantially continuous prearranged course, said space between said associated conductive sections depicting the width of said path, and means for electrically energizing said conductor so the current flow in one of said associated conductive sections at any given instant is opposite in direction to the current flow in the other of said associated conductive sections, thereby providing a relative null in the electromagnetic field in the center of said path between said associated conductive sections with electromagnetic fields of opposite sense available on each side of the center of said path.

References Cited in the file of this patent

UNITED STATES PATENTS

| | | |
|---|---|---|
| 1,856,991 | Franklin | May 3, 1932 |
| 2,074,251 | Braun | Mar. 16, 1937 |
| 2,317,400 | Paulus et al. | Apr. 17, 1943 |
| 2,339,291 | Paulus et al. | Jan. 18, 1944 |
| 2,493,755 | Ferill | Jan. 10, 1950 |
| 2,690,626 | Gay et al. | Oct. 5, 1954 |
| 2,803,743 | Ballerait | Aug. 20, 1957 |
| 2,847,080 | Zworykin | Aug. 12, 1958 |